(12) United States Patent
Pietryga et al.

(10) Patent No.: US 8,108,968 B2
(45) Date of Patent: Feb. 7, 2012

(54) GROMMET ASSEMBLY

(75) Inventors: Brad L. Pietryga, Shelby Township, MI (US); Douglas P. Gonsler, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 387 days.

(21) Appl. No.: 12/372,041

(22) Filed: Feb. 17, 2009

(65) Prior Publication Data

US 2010/0205771 A1 Aug. 19, 2010

(51) Int. Cl.
*F16L 5/02* (2006.01)
(52) U.S. Cl. ........ 16/2.2; 16/2.1; 174/153 G; 174/152 G
(58) Field of Classification Search .............. 16/2.1, 16/2.5; 174/152 R, 153 G, 154, 152 G, 650; 248/56, 231.9
See application file for complete search history.

(56) References Cited

U.S. PATENT DOCUMENTS

| 5,300,734 | A * | 4/1994 | Suzuki ...................... 174/152 G |
| 5,856,635 | A * | 1/1999 | Fujisawa et al. ........... 174/153 G |
| 6,211,464 | B1 * | 4/2001 | Mochizuki et al. ........... 174/659 |
| 6,267,385 | B1 * | 7/2001 | Okamoto et al. ............. 277/627 |
| 6,328,498 | B1 * | 12/2001 | Mersch ........................ 403/175 |
| 6,815,615 | B1 * | 11/2004 | Haulotte et al. .............. 174/667 |
| 7,390,969 | B2 * | 6/2008 | Fraley et al. ................. 174/72 A |
| 2006/0219446 | A1 * | 10/2006 | Delaine ......................... 180/65.2 |

FOREIGN PATENT DOCUMENTS

JP 09039688 A * 2/1997

* cited by examiner

*Primary Examiner* — Chuck Y. Mah

(57) ABSTRACT

A grommet assembly includes a retainer including a sleeve, and a boot secured to the retainer, including a first and a second series of pleats aligned with the sleeve, each pleat of the second series decreasing in size as distance from the retainer increases, each pleat of the first series having a substantially uniform size and spaced from a consecutive pleat of the first series by a distance that is less than a space between consecutive pleats of the second series.

5 Claims, 2 Drawing Sheets

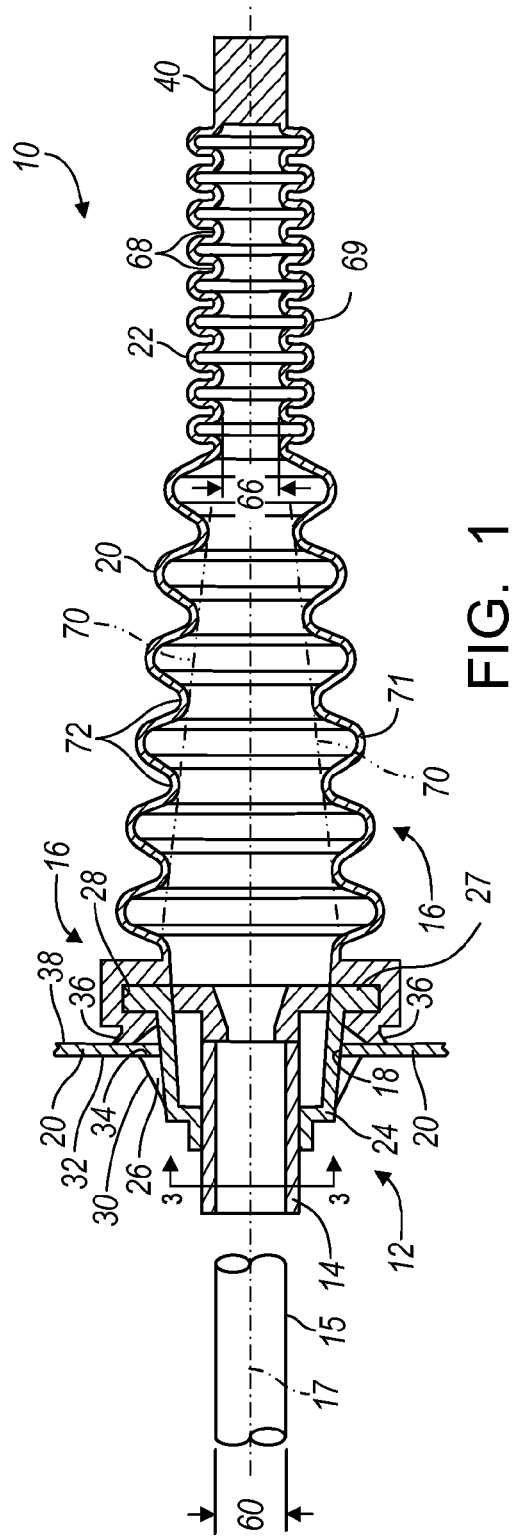
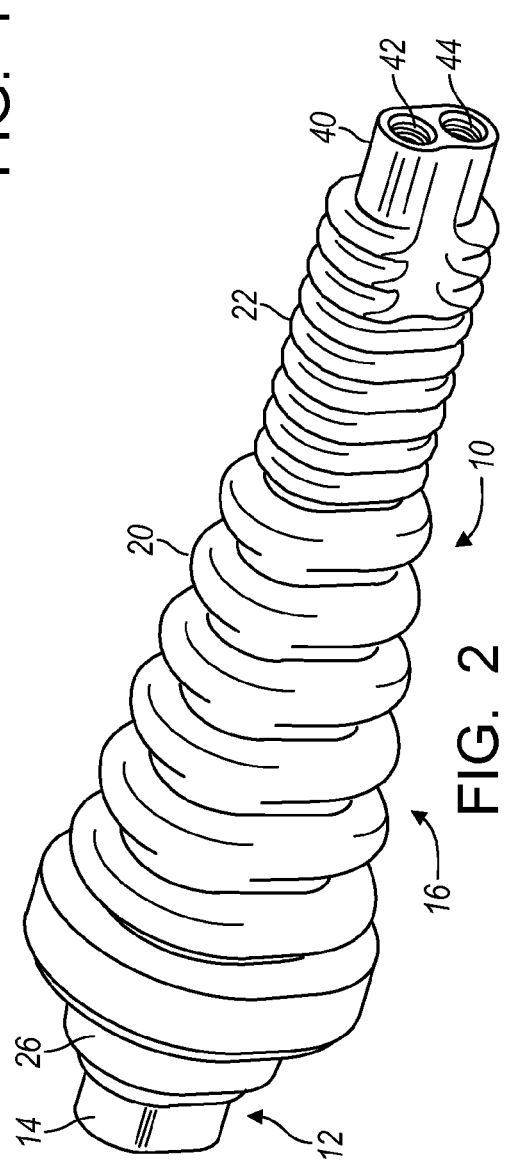

GROMMET ASSEMBLY

BACKGROUND OF INVENTION

The present invention relates generally to an apparatus through which wire harnesses, cables, linkages and rods can be passed through an opening in a vehicle body component, such as a hydraulic or non-hydraulic power liftgate.

Grommets are rings of metal, plastic or rubber, which are inserted into a hole made through another material to reinforce the hole or to shield something passed through the grommet from the sharp edges of the hole. Grommets also prevent fluids and gases from entering or exiting the vehicle through the hole.

In a vehicle, wire harnesses, cables, linkages, hydraulic lines, rods, and other such equipment must pass from inside the vehicle body to doors, hoods and liftgates, which are supported on hinges and swing open and closed relative to the body. In such applications, there is potential for significant relative motion between the material and the pass through opening. For example, power gate struts, brake lines, linkages and hydraulic lines for a power liftgate that pass from inside to outside the vehicle need to travel back and forth through the opening when the gate is opened and closed.

A conventional grommet restricts relative motion between the opening and material translating through the opening, or requires a greater length of the translating material than would be required to accommodate the motion of the door or liftgate relative to the opening.

For electrical harness applications, loops are used to allow for a twisting or hinging motion that stores and provides the required length for cycling. But packaging space may not be available or the translating material may be too stiff to loop without kinking.

A need exits in the industry for a pass-through grommet that allows for repeated cyclic translation of material in and out of a body opening, while protecting the sealing material from abrasion and subsequent loss of sealing.

SUMMARY OF INVENTION

A grommet assembly includes a retainer including a sleeve, and a boot secured to the retainer, including a first and a second series of pleats aligned with the sleeve, each pleat of the second series decreasing in size as distance from the retainer increases, each pleat of the first series having a substantially uniform size and spaced from a consecutive pleat of the first series by a distance that is less than a space between consecutive pleats of the second series.

The grommet provides potential for applications in which wire harnesses, cables, linkages and rods are passed through an opening in a vehicle body. The grommet allows repeated, cyclic translation of hoses in and out of a body opening while maintaining the opening sealed and the translating material protected from abrasion.

The grommet has small sections and requires less space for excess material, thereby improving packaging potential compared to alternatives. The design minimizes weight and cost, and requires less rubber and wire than conventional designs.

The scope of applicability of the preferred embodiment will become apparent from the following detailed description, claims and drawings. It should be understood that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

FIG. 1 is a cross section taken at a longitudinal plane through a grommet assembly installed in an opening;

FIG. 2 is a perspective side view of the grommet assembly of FIG. 1;

DETAILED DESCRIPTION

Figure 3:
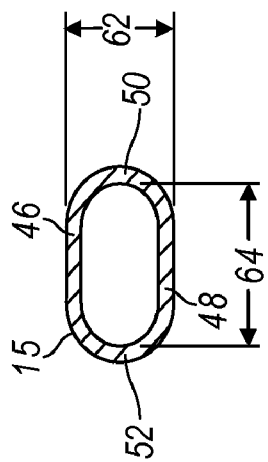
FIG. 3 is a cross section taken through the retainer and its inner sleeve taken at plane 3-3 of FIG. 1.

Referring now to the drawings, there is illustrated in FIG. 1 a two piece grommet assembly 10, which includes a retainer 12 having an inner sleeve 14 for guiding the translating material 15, and a pleated grommet boot 16. The retainer 12 and boot 16 are aligned about an axis 17. Sleeve 14 guides the translating material 15 through an opening 18 in a wall 20 and prevents significant sliding contact between the translating material and the boot 16. The retainer guides and directs the material controlling its shape as it translates. Some minimal contact may take place between the boot and material, but that contact occurs under the low load required to deflect the boot to the path or shape of the translating material throughout its travel.

The translating material could be rods, flexible high-pressure lines, or bundles containing a wire harness, hoses or conduits, high-pressure lines or tubing. The opening 18 is formed in an external panel 32 of a vehicle body.

The grommet boot 16 is a molding formed preferably of ethylene propylene diene M-class rubber (EPDM).

Boot 16 comprises a compressible portion that includes a series of pleats 20 that are tapered along the length of the boot to prevent or minimize contact with the translating media 15. The taper pleats 20 also prevent the grommet 10 from collapsing on itself during compression.

Boot 16 further comprises a series of smaller diameter pleats 22 along a length of the boot 16 where little relative motion occurs between the translating material 15 and the boot 16. The relatively small size of the pleats 22 guides the translating material 15 preventing significant contact with the boot pleats 20 in the compressible area, where the highest relative motion occurs between the boot 16 and the translating material 15. The boot pleats 22 provide flexibility and allow minimal compression.

The retainer 12 includes an inner sleeve 14, outer sleeve 24, stop 26 and ring 27, molded as one integral component of the grommet assembly 10. Ring 27, located at the end of the outer sleeve 24, is fitted into a recess 28, molded integrally in the grommet boot 16, thereby securing the retainer 12 to the boot 16. The stop 26 has a tapered surface 30, which facilitates pushing the retainer 12 through the opening 18 from the right-hand side of the wall 20.

The left-hand side 32 of wall 20 is forced elastically into contact with the end face 34 of stop 26 due to compressing the lip 36, located at the end of the grommet boot 16, against the right-hand side 38 of wall 20. Contact between lip 36 and wall 20 provides an elastic seal that prevents passage of extraneous material into the boot 16.

The retainer 12 creates a predictable deflection of the translating material 15 as it oscillates in the boot 16 as a door or liftgate is opened and closed in service. Retainer 12 is a molded component preferably of plastic such as Nylon or acetel having a lower coefficient of friction than that of the EPDM boot 16.

FIG. 2 shows that the right-hand end of boot 16 supports a plug or interface 40, formed integrally with the boot 16, the plug 40 having two longitudinal passages, through which the translating material exits the boot 16. The first passage is formed with an annular bead 42, which frictionally engages the translating material in the first passage. The second passage is formed with an annular bead 44, which frictionally engages the translating material in the second passage.

As FIG. 3 illustrates, the cross section through the retainer 12 and its inner sleeve 14 has an oblong shape, i.e., two straight sides 46, 48 connected by arcuate surfaces 50, 52.

Figure 4:
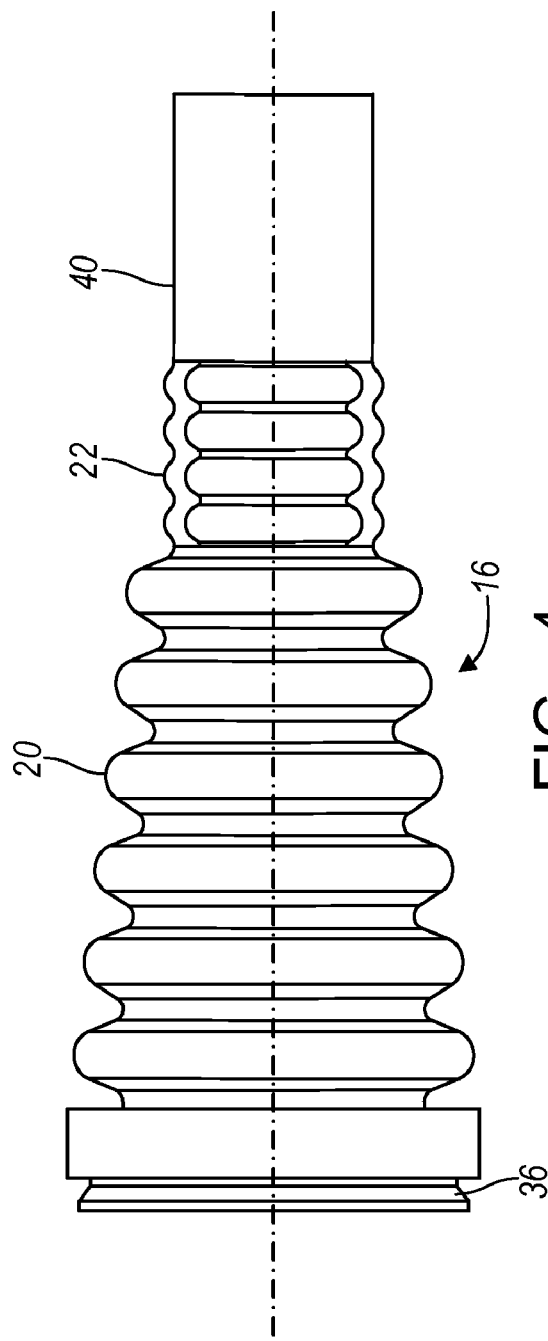
FIG. 4 is a side view of the grommet boot of FIGS. 1 and 2.

FIG. 4 illustrates the grommet boot 16 without the retainer 12.

Referring to FIGS. 1-4, preferably the thickness 60 of the translating material 15 is less than the distance 62 between surfaces 46, 48 of the inner sleeve 14, and the width of the translating material is less than the distance 64 between surfaces 50, 52 of the inner sleeve. Preferably the thickness 60 of the translating material 15 is about the same or slightly less that the distance 66 between the valleys 68 of the boot pleats 22 and less than the distance 70 between the valleys 72 of the boot pleats 20. Crests 69 are located between the valleys 68, and crests 71 are located between the valleys 72.

The optional smaller boot pleats 22 prevent buckling of the boot by allowing compression on the inside surface and extension on the outside surface during bending. The distance 66 between the smaller boot pleats 22 control the relative position between the boot pleats 20 and the translating material 15 during the deflection of the translating material 15 as it oscillates in the boot 16 through the opening 18. The larger boot pleats 20 are sized with respect their diameter, wall thickness and distance between successive pleats such that the pleats 22 remain stable and support one another against collapse when a compressive force is applied to the boot 16 as the translating material 15 bends and or oscillates in the boot 16 through the opening 18 when the door or liftgate opens and closes.

While certain embodiments of the present invention have been described in detail, those familiar with the art to which this invention relates will recognize various alternative designs and embodiments for practicing the invention as defined by the following claims.

What is claimed is:

1. A grommet assembly comprising:
   a retainer including a sleeve, the sleeve oriented extending axially along and centered about an axis; and
   a boot secured to the retainer, including a first series of pleats extending axially along and centered about the axis and aligned with the sleeve, each pleat decreasing in size as distance from the retainer increases, each pleat including a crest and a valley, an outer surface of said crests decreasing in distance from the axis as distance of the respective crest from the retainer increases, and an inner surface of said valleys decreasing in distance from the axis as distance of the respective valley from the retainer increases, and a second series of pleats extending axially and centered about the axis and aligned with the sleeve and extending directly from the first series of pleats, each pleat of the second series having a substantially uniform size and spaced from a consecutive pleat of the second series by a distance that is less than a space between consecutive pleats of the first series, each pleat of the second series including a crest and a valley, an outer surface of said crests of the second series being a substantially uniform distance from the axis, and an inner surface of said valleys of the second series being a substantially uniform distance from the axis, the inner surface of the valleys of the second series of pleats being sized and shaped to slidably receive a translating material that is freely slidable inside the second series of pleats, the pleat of the first series that is adjacent to the pleat of the second series engaging and only supported by the adjacent pleat of the second series and the pleats of the first series.

2. The assembly of claim 1 further comprising:
   an interface formed integrally with the boot, including a longitudinal passage through which translating material exits the boot, and an annular bead located in the passage for frictionally engaging the translating material.

3. The assembly of claim 1 wherein a coefficient of friction of a material from which the retainer is formed is less than a coefficient of friction of a material from which the boot is formed.

4. The assembly of claim 1 wherein:
   the retainer further includes a stop able to engage a first side of a wall; and
   the boot further includes a lip facing the stop and engageable with a second side of the wall.

5. The assembly of claim 1 wherein:
   the boot further includes a recess formed integrally with the boot; and
   the retainer further includes a ring able to engage the recess, said engagement securing the boot to the retainer.

* * * * *